United States Patent [19]
Line

[11] Patent Number: 6,155,218
[45] Date of Patent: Dec. 5, 2000

[54] CAM ADVANCING AND RETARDING MECHANISM

[75] Inventor: Richard J. Line, Sterling Heights, Mich.

[73] Assignee: The United States of America as represented by the Secretary of the Army, Washington, D.C.

[21] Appl. No.: 09/274,816

[22] Filed: Mar. 22, 1999

[51] Int. Cl.[7] .................................................. F01L 1/344
[52] U.S. Cl. .................................. 123/90.15; 123/90.17; 123/90.31
[58] Field of Search .............................. 123/90.15, 90.17, 123/90.31

[56] References Cited

U.S. PATENT DOCUMENTS

| | | | |
|---|---|---|---|
| 3,441,009 | 4/1969 | Rafanelli | 123/90.15 |
| 3,888,217 | 6/1975 | Hisserich | 123/90.31 |
| 4,484,543 | 11/1984 | Maxey | 123/80 BA |
| 4,726,331 | 2/1988 | Oyaizu | 123/90.15 |
| 4,862,845 | 9/1989 | Butterfield et al. | 123/90.15 |
| 5,109,813 | 5/1992 | Trzmiel et al. | 123/90.15 |
| 5,152,261 | 10/1992 | Butterfield et al. | 123/90.15 |
| 5,197,420 | 3/1993 | Arnold et al. | 123/90.15 |
| 5,297,508 | 3/1994 | Clarke et al. | 123/90.17 |
| 5,323,739 | 6/1994 | Mollers | 123/90.15 |

*Primary Examiner*—Weilun Lo
*Attorney, Agent, or Firm*—Peter A. Taucher; David L. Kuhn

[57] ABSTRACT

An engine accessory retards or advances one or more cam shafts of an engine relative to the crankshaft during engine operation. The accessory acts upon the timing chain that engages wheels on cam shafts and crankshaft. The accessory includes a rod translatably mounted to the engine, wherein a hydraulic cylinder or an electric motor translates the rod in accordance with signals from an electronic controller. The signals from the controller are in response to values of selected variables related to engine condition or are in response to manual input. Chain engagement wheels are journalled on either end of the rod. One chain engagement wheel mates with the part of the timing chain approaching the crankshaft wheel. The other chain engagement wheel mates with the part the chain travelling away from the crankshaft wheel. Translation of the rod affects the chain length between the crankshaft wheel and the camshaft wheels which are driven by the crankshaft wheel, whereby the rod's translation retards or advances the cam shafts relative to the crankshaft.

4 Claims, 1 Drawing Sheet

CAM ADVANCING AND RETARDING MECHANISM

GOVERNMENT USE

The invention described here may be made, used and licensed by the or for the U.S. Government for governmental purposes without paying me any royalty.

BACKGROUND AND SUMMARY

In the inventor's experience, it occasionally happens that timing chains on vehicle engines will slip during operation due to timing gear wear or chain stretch. Frequently, the vehicle engine will still run, although performance is less than optimal, and will continue to run until accumulated chain slippage reaches a critical amount. When the engine thus runs poorly or stops, it is impractical to immediately adjust the timing chain to correct the chain slip. Of particular concern are military vehicles operating in a combat zone. My invention addresses the need for relatively instantaneous timing chain adjustment that obviates the need for tools, a special repair area and even the need to stop the vehicle. My invention works in concert with, or mechanically incorporates, a tension control mechanism that not only keeps a predetermined tension on the chain but also avoids stretching the chain beyond manufacturer tolerances or other chosen limit. The tension control mechanism can include means to detect a given degree of chain stretch and send an appropriate alarm signal when that degree of chain stretch occurs. Perhaps more importantly, the invention can also adjust engine timing during normal vehicle operation so as to maximize engine performance parameters such as power or fuel efficiency and minimized emissions, or to adapt the engine to varied types or grades of fuel. The adjustment can be automatic and powered by actuating mechanisms such as an electric motor, or a hydraulic or pneumatic cylinder, or other suitable conventional means. Additionally or alternatively, the adjustment can be manual and be accomplished with hand tools My invention is an engine accessory that acts during engine operation to retard or advance one or more engine cam shafts relative to the crankshaft by adjusting the timing chain that engages wheels on cam shafts and crankshaft. The accessory includes a rod translated by a hydraulic cylinder or an electric motor, wherein the cylinder or motor act in accordance with signals from an electronic controller. The controller itself responds to a human driver's input or to values of selected engine condition variables. At least one chain engagement wheel spins on either end of the rod. One chain engagement wheel meshes with the part of the timing chain approaching the crankshaft wheel while the other chain engagement wheel meshes with the part the chain travelling away from the crankshaft wheel. Translation of the rod affects the chain length between the crankshaft wheel and the camshaft wheels, thereby retarding or advancing the cam shafts relative to the crankshaft. The means for maintaining controlled tension on the chain can conventionally be a gear meshed with the chain and rotatable on a translatable rod mechanically forced or biased toward the chain wherein an alarm signal is triggered when the rod reaches a chosen position. Optionally, the tension control mechanism can be part of the accessory that retards or advances the cam shafts relative to the crankshaft.

It is contemplated that the invention can be used in a testing scenario wherein the engine and controller are not necessarily located in a vehicle but are mounted to a test stand. Various designs of engine components such as pistons, cam shafts and valves can be installed in an experimental engine. These components can be tested over a selected range of timing chain settings.

DETAILED DESCRIPTION

Figure 1:
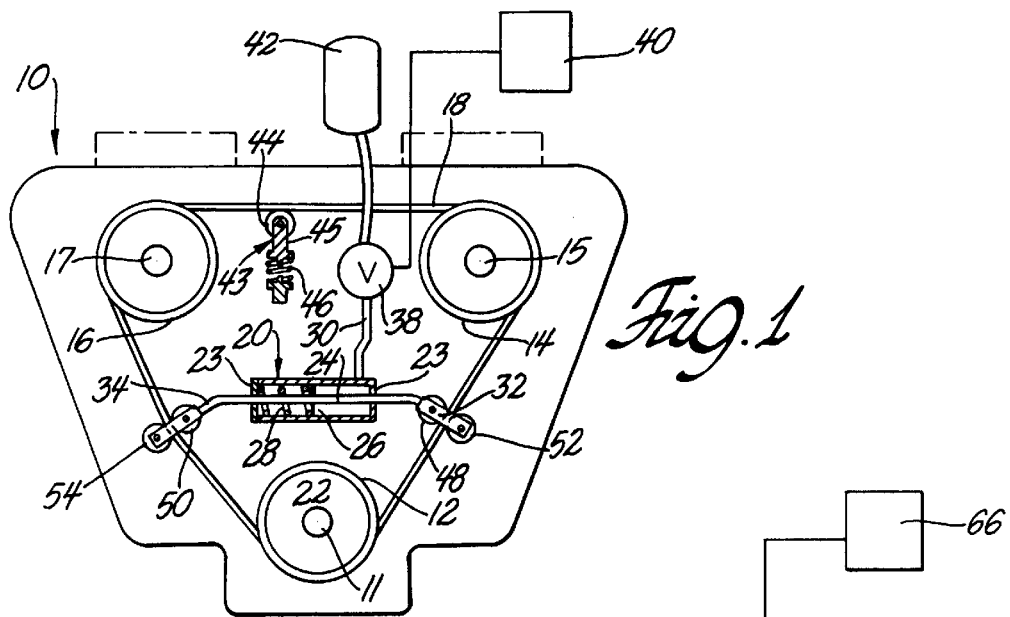
FIG. 1 is a frontal view of an engine having my timing adjustment mechanism thereon.

In FIG. 1 is an internal combustion engine 10 having a crankshaft wheel 12 rotated by the engine's crankshaft (not shown) and having two cam shaft wheels 14 and 16 connected to cam shafts (not shown) of the engine. A closed flexible loop such as timing belt or chain 18 engages the various wheels so that crankshaft wheel 12 drives cam shaft wheel 14 and 16, as is conventional. The ends of the cam shafts are designated as 15 and 17, and the end of the crankshaft is designated as 11. Most commonly, the wheels all have gear teeth that engage links of the chain, but for convenience, the individual teeth and links are not detailed in FIGS. 1 through 3.

An advancing-retarding accessory or mechanism 20 adjusts the cam shafts' angular position relative to the crankshaft. Mechanism 20 is mounted to the engine in a zone surrounded by wheels 12, 14 and 16. Mechanism 20 typically includes a pressure-actuated cylinder fixed to the engine block and a translatable rod 24 passing therethrough. Typically too, the end walls 23 of the cylinder act as guides to limit the motion of rod 24 to translation relative to the cylinder. The translational position of rod 24 depends on the relative amount of force exerted on either side of septum wall 26 fixed to rod 24 in cylinder 22. On one side of wall force is exerted by coil spring 28 and on the opposite side of wall 26 force is exerted by pressure through line 30.

The pressure from line 30 is varied by valve 38, which is governed by electronic controller 40 in response to selected variables such as load on the vehicle engine, transmission gear selected, vehicle speed, fuel-to-air ratio, or engine rpm. Additionally, controller 40 can send signals in response to manual input from the driver of the vehicle. Pressure to line 30 can come from any suitable source 42 such as an accumulator or pump or engine 10 itself.

Translatable rod 24 has two bifurcated end segments 32 and 34 that preferably form dog-leg bends so as to be normal to the respective sections of chain 18. Journalled in the bifurcated sections are gear wheels 48 and 50 whose gear teeth engage chain 18. Retainer wheels 52 and 54 are journalled in the bifurcated sections in opposed relation to the gear wheels and serve to keep chain 18 in engagement with the gear wheels. Wheels 52 and 54 may be toothed in the same fashion as wheels 48 and 52 to engage chain 18. In order to retard the angular position of the cam shaft wheel relative to the crankshaft wheel during clockwise rotation of wheels 12, 14 and 16, rod 24 is translated to the left by cylinder 22 to the position shown in FIG. 1. This can be accomplished while the engine is running. Similarly, to advance the position of the cam shaft wheels relative to the crankshaft wheel, rod 24 is translated to the right. It may be preferred that cylinder 22 is normally not pressurized, whereby rod 24 normally seeks a default translational position determined by the bias of spring 28 and the tension on timing chain 18.

FIG. 1 shows a chain tension governor 43 that works in conjunction with advancing-retarding mechanism 20. Governor 43 has a gear wheel 44 meshing with chain 18 and rotating on the end of member 45. Spring 46 biases member 45 and gear wheel 44 against chain 18 so as to keep tension on chain 18 within desired limits.

Figure 2:
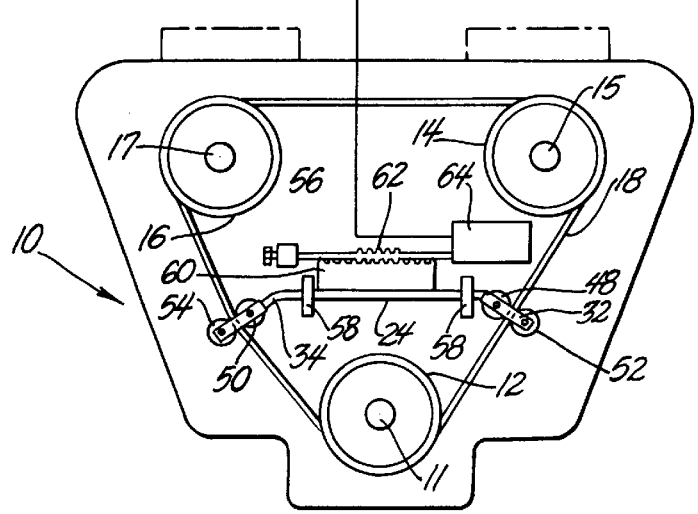
FIG. 2 is a frontal view of the engine having an alternate embodiment of the timing adjustment mechanism thereon.

In FIG. 2 is shown an alternate embodiment 56 of the mechanism to advance or retard the cam shafts relative to the crankshaft. There, translatable rod 24 slides through guides 58 fixed to engine 10, rod 24 adjusting timing chain 18 as in the FIG. 1 embodiment. On rod 24 is a toothed rack 60 engaged by a worm gear 62 that is driven by a small electric motor 64 mounted on engine 10. Motor 64 is a stepper motor and is governed by electronic controller 66 in response to selected variables such as load on the vehicle engine, vehicle speed, fuel-to-air ratio, or engine rpm.

Figure 3:
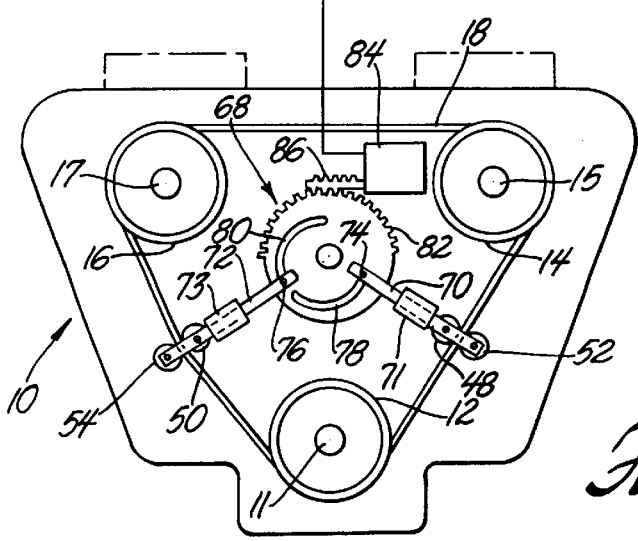
FIG. 3 is a frontal view of the engine having a second alternate embodiment of the timing adjustment mechanism thereon.

In FIG. 3 is shown a second alternate embodiment 68 of the advancing and retarding mechanism wherein shafts 70 and 72 are used in lieu of rod 24. Shaft 70 fits closely and slides in sleeve 71 fixed to engine 10, and shaft 72 fits closely and slides in sleeve 73, which is also fixed to engine 10. Gear wheel 48 and retainer wheel 52 are journalled on one end of shaft 70 while gear wheel 50 and retainer wheel 54 are journalled on one end of shaft 72. Shaft 70 has a pin 74 sliding in eccentric slot 78 of gear 82 and shaft 72 has a pin 76 sliding in eccentric slot 80 of gear 82. The slots are positioned and shaped so that counterclockwise rotation of gear 82 translates rod shaft 70 outward relative to the gear while translating shaft 72 inward relative to the gear. The effect of the counterclockwise rotation of gear 82 is to advance cam shaft wheels 14 and 16 relative to the drive shaft wheel 12. In similar fashion, clockwise rotation of gear 82 retards the cam shaft wheels relative to the crankshaft wheel. Gear 82 is rotated by motor 84 acting through a suitable drive gear 86. Motor 84 is governed by electronic controller 88 in response to selected engine condition variables.

I wish it to be understood that I do not desire to be limited to the exact details of construction or method shown herein since obvious modifications will occur to those skilled in the relevant arts without departing from the spirit and scope of the following claims.

What is claimed is:

1. A device for retarding or advancing one or more cam shaft wheels of an engine relative to an engine's crankshaft wheel during operation of the engine, wherein the wheels are engaged by a timing chain, the device comprising:

rod translatably mounted to the engine;

means for translating the rod;

means for controlling the translating means in response to selected engine conditions;

a chain engagement wheel journalled on either end of the rod, one chain engagement wheel mated with one portion of the timing chain approaching the crankshaft wheel and another chain engagement wheel mated with another portion of the chain travelling away from the crankshaft wheel;

wherein translation of the rod affects the degree of retardation or advancement of the cam shaft wheel relative to the crankshaft wheel; and wherein the chain engagement wheels are matched pairs of wheels, at least one of the wheels of the matched pair having teeth meshing with links of the timing chain, another wheel of the matched pair being in opposed relation to the one wheel of the matched pair, so that the timing chain passes between the matched pair of wheels.

2. The device of claim 1 wherein the means for translating the rod comprises:

a pressure-actuated cylinder affixed to the engine, the rod translatable in the cylinder;

a pressurizable chamber within the cylinder;

a spring within the cylinder;

a septum wall separating the pressurizable chamber from the spring;

wherein pressure in the chamber works against a bias of the spring.

3. The device of claim 1 wherein the ends of the rod have dog leg sections where the chain engagement wheels are mounted, the dog leg sections being oriented normal to the respective portions of the timing chain passing between the matched pairs of wheels.

4. The device of claim 1 wherein the means for translating the rod comprises:

an electric motor mounted to the engine;

a worm gear driven by the electric motor;

a rack fixed to the rod and engaged with the worm gear;

guides fixed to the engine, the guides limiting the motion of the rod to translation along a longitudinal axis of the rod.

* * * * *